(12) United States Patent
Gordon

(10) Patent No.: US 8,806,799 B1
(45) Date of Patent: Aug. 19, 2014

(54) FRONT SIGHT OF A WEAPON

(71) Applicant: James Gordon, Jackson, WY (US)

(72) Inventor: James Gordon, Jackson, WY (US)

( * ) Notice: Subject to any disclaimer, the term of this patent is extended or adjusted under 35 U.S.C. 154(b) by 0 days.

(21) Appl. No.: 14/088,590

(22) Filed: Nov. 25, 2013

(51) Int. Cl.
  *F41G 11/00* (2006.01)
  *F41G 1/033* (2006.01)
  *F41G 1/01* (2006.01)

(52) U.S. Cl.
  CPC *F41G 1/033* (2013.01); *F41G 1/01* (2013.01); *F41G 11/003* (2013.01)
  USPC .............................................. 42/130; 42/139

(58) Field of Classification Search
  CPC ......... F41G 11/003; F41G 1/473; F41G 1/01; F41G 1/00; F41G 1/02
  USPC .................... 42/111, 112, 127, 130, 135, 139
  See application file for complete search history.

(56) References Cited

U.S. PATENT DOCUMENTS

| | | | |
|---|---|---|---|
| 318,999 A | 6/1885 | Maynard | |
| 873,535 A | 12/1907 | Garrison et al. | |
| 1,989,245 A | 1/1935 | Redfield | |
| 2,073,856 A | 3/1937 | Stewart | |
| 2,479,277 A | 8/1949 | Terhaar | |
| 2,498,329 A | 2/1950 | Barnes | |
| 4,790,075 A | 12/1988 | Howard, Sr. | |
| D328,485 S | 8/1992 | Crowley | |
| 5,222,302 A * | 6/1993 | DeBatty et al. | 42/121 |
| 5,590,484 A * | 1/1997 | Mooney et al. | 42/111 |
| 6,321,479 B1 * | 11/2001 | Sheehan | 42/111 |
| 7,905,044 B2 * | 3/2011 | Clouser | 42/122 |
| 8,393,108 B1 | 3/2013 | Wilson | |
| 2008/0134561 A1 * | 6/2008 | Clouser | 42/113 |
| 2010/0319234 A1 * | 12/2010 | Clouser | 42/111 |

* cited by examiner

Primary Examiner — Michael David
(74) Attorney, Agent, or Firm — Stetina Brunda Garred & Brucker

(57) ABSTRACT

A front sight assembly that can be mounted to a barrel and a gas block is disclosed. The front sight assembly has a barrel mount that allows the front sight assembly to pivot about the barrel. The front sight assembly also has a gas block mount that allows the user to pivot and set the front sight left or right to allow for windage. The front sight assembly may also have a front sight disposed over the gas block mount.

8 Claims, 8 Drawing Sheets

FRONT SIGHT OF A WEAPON

CROSS-REFERENCE TO RELATED APPLICATIONS

Not applicable

STATEMENT RE: FEDERALLY SPONSORED RESEARCH/DEVELOPMENT

Not applicable

BACKGROUND

The various embodiments and aspects disclosed herein relate to a replacement front sight assembly for a rifle.

An AK-47 is a rifle first developed in the USSR by Mikhail Kalashnikov. AK-47 rifles are typically low tolerance rifles that have significant fitting issues. One of the most common problems on the AK-47 is a canted front sight. As shown in FIG. 1, the stock front sight is mounted to the barrel of the weapon. The front sight is a strut that is pinned to the barrel with a center post that can be shifted to the left or right independent of the outer ring to allow for windage. A centered strut typically provides an aligned sight picture, as shown in FIG. 2A. Unfortunately, some struts are canted to one side or the other so that when the post is centered to the rear sight, the strut is shifted to the extreme left or right, as shown in FIGS. 2B and 2C. In extreme cases, the post cannot be shifted far enough so that the point of aim and the point of impact are not aligned.

Accordingly, there is a need in the art for a method and device to improve the front sight of the rifle.

BRIEF SUMMARY

A front sight assembly is disclosed herein which replaces a stock front sight assembly to provide a proper front sight picture (see FIG. 2A) when the front and rear sights are sighted in. The front sight assembly includes a barrel mount and a gas block mount stacked upon each other vertically. To mount the front sight assembly, the barrel mount may be disassembled so that the barrel mount may be disposed over and eventually secured to the barrel. The gas block mount may be fabricated from a unitary material with the barrel mount. The gas block mount may be slipped over an upper portion of the gas block by partially disassembling the firearm. The barrel mount is snugly fit about the barrel so that the front sight assembly may pivot about the barrel mount, and more particularly, a central axis of the barrel. A front sight may be mounted to the top side of the gas block mount. To adjust for windage, set screws in the gas block mount may be used to pivot and fix the front sight assembly to the left or right about the central axis of the barrel to sight in the front sight.

More particularly, a replacement front sight for an AK-47 is disclosed. The replacement front sight may comprise a gas block mount, a barrel mount and a front alignment member (e.g., front post). The gas block mount may have an upper aperture for receiving a gas block of the AK-47. The gas block mount may have left and right lateral adjusters (e.g., screws, set screws). The barrel mount may be attached to a bottom side of the gas block mount. The barrel mount may have a lower aperture for receiving a barrel of the AK-47. The front alignment member may be attached to an upper side of the gas block mount for alignment with a rear alignment member of a rear sight of the AK-47. The left and right adjusters may be adjusted to sight-in the front alignment member and the rear alignment member so that the point of impact coincides with the point of aim of the AK-47.

The gas block mount and barrel mount may be fabricated from metal, composite, plastic or combinations thereof.

The aperture of the gas block mount may have a continuous circular inner periphery.

The barrel mount may comprise an upper bracket and a lower bracket. The lower bracket may be removable from the upper bracket for mounting the barrel mount to the barrel of the AK-47 without disassembly of the barrel of the AK-47.

The left and right adjusters may be disposed about a vertical midpoint of the gas block mount on opposed sides of the gas block mount.

The left adjuster may be a set screw threadably engaged to a left threaded hole in a left side of the upper body. The right adjuster may be a set screw threadably engaged to a right threaded hole in a right side of the upper body.

The aperture of the gas block mount may have a circular inner periphery and an inner diameter of the inner periphery may be about 0.1875 inches greater than an outer diameter of an upper portion of the gas block to provide for lateral adjustment of the front alignment member.

In another aspect, a replacement front sight for straightening a canted original front sight of an AK-47 is disclosed. The replacement front sight may comprise a gas block mount, a barrel mount and a mount. The gas block mount may have an upper aperture for receiving a gas block of the AK. The upper body may have left and right lateral adjusters. The left and right adjusters may be adjusted to sight in the front alignment member and a rear alignment member of a rear sight of the AK-47. The barrel mount may be attached to a bottom side of the gas block mount. The lower body may have a lower aperture for receiving a barrel of the AK-47. The mount is used to attach a front alignment member to the gas block mount. The mount may be secured or attached to an upper side of the gas block mount.

In another aspect, a method for replacing a canted original front sight of an AK-47 is disclosed. The method may comprise the steps of removing a gas tube from a gas block of the AK-47; loosening left and right adjusters of a replacement front sight; disposing a gas block mount of the replacement front sight over a gas block of the AK-47; securing a barrel mount of the replacement front sight over a barrel of the AK-47; attaching the gas tube to the gas block of the AK-47; and tightening and loosening the left and right adjusters to sight-in the replacement front sight of the AK-47.

In the method, the sighting in step may comprise the steps of aligning a rear alignment member, a front alignment member and an object downrange; taking at least one shot; loosening the left adjuster and then tightening the right adjuster if the point of impact is left of the point of aim or loosening the right adjuster and then tightening the left adjuster if the point of impact is right of the point of aim.

In the method, the step of securing may comprise the steps of disassembling upper and lower halves of the lower body; disposing the upper half over the barrel of the AK-47; and tightening the upper and lower halves together to secure the lower body to the barrel of the AK-47.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
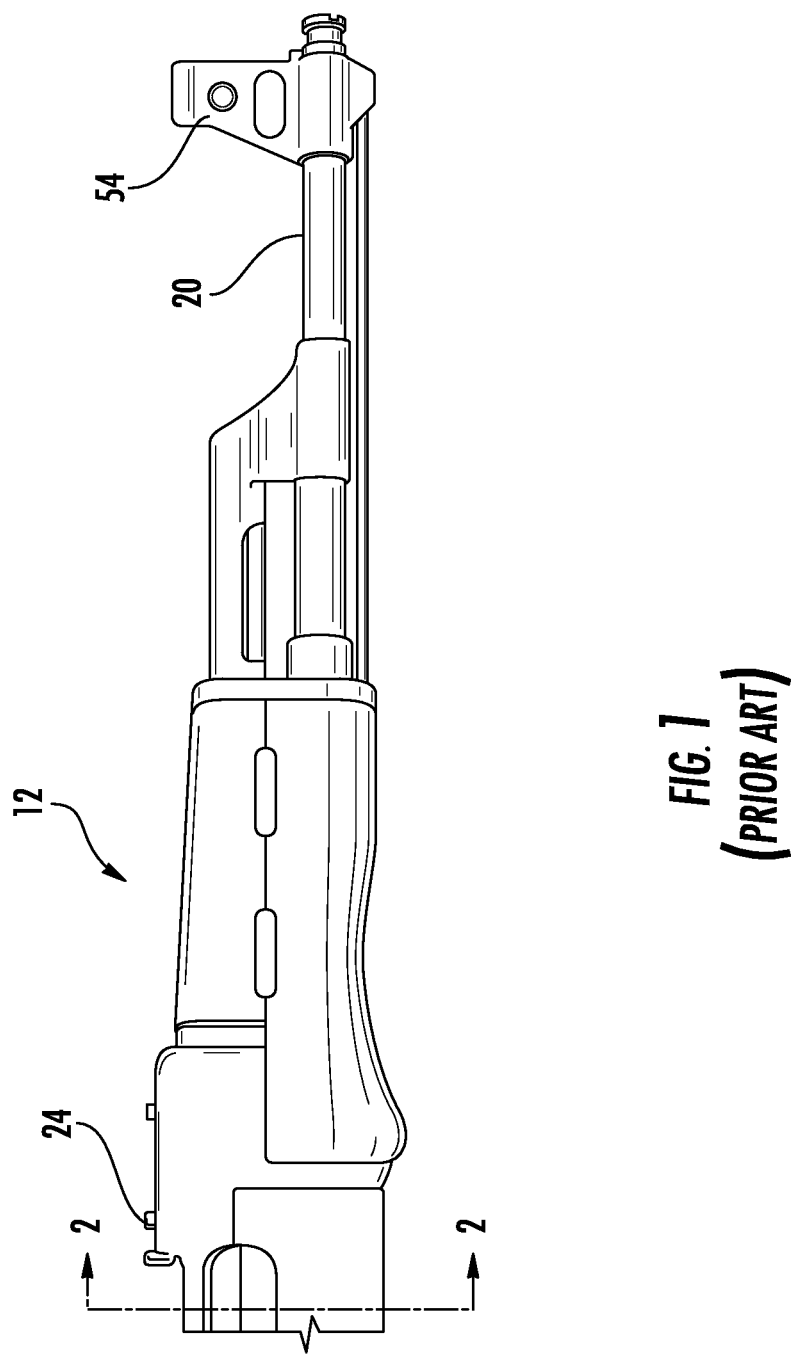
FIG. 1 is a side view of an AK-47.
Figure 2A:
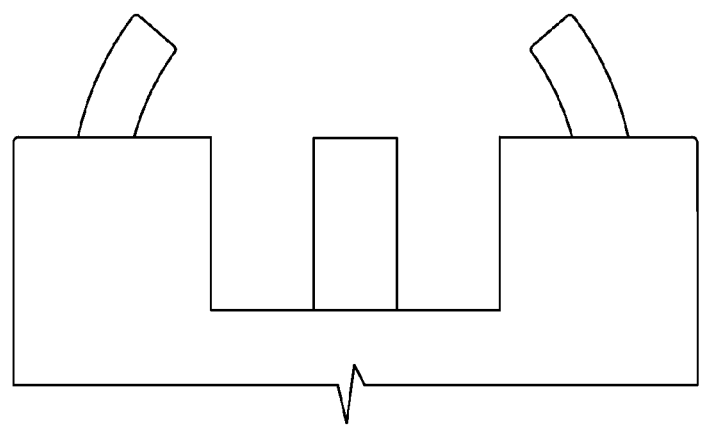
FIG. 2A is a first sight picture of the AK-47 shown in FIG. 1.
Figure 2B:
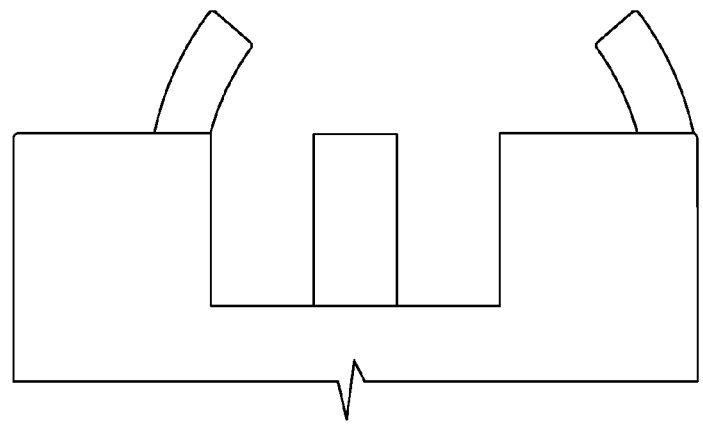
FIG. 2B is a second sight picture of the AK-47 shown in FIG. 1.
Figure 2C:
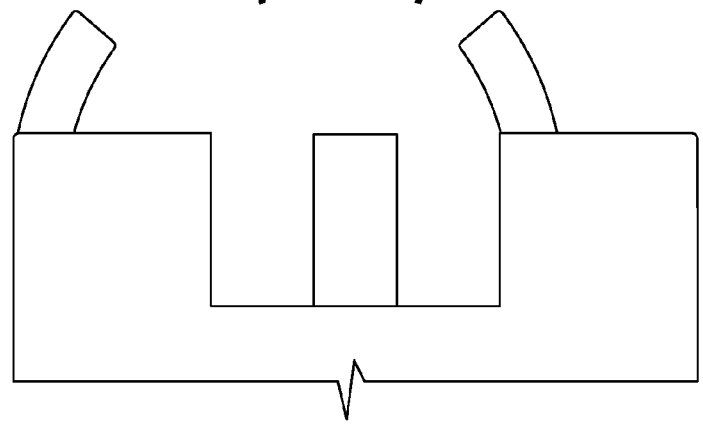
FIG. 2C is a third sight picture of the AK-47 shown in FIG. 1.

Referring now to the drawings, a front sight assembly 10 of an AK-47 12 is shown, which is a replacement for a stock front sight of a AK-47 12. The stock front sight 54 may be removed from the stock AK-47 12 and replaced with the front sight assembly 10. The front sight assembly 10 is mounted to a barrel 20 and gas block 22 of the AK-47 12 to provide better alignability of the front sight 14 of the front sight assembly 10 to a rear sight 24 of the AK-47 12. The front sight 14 of the front sight assembly 10 may be adjusted left and right to allow for windage. This resolves the problem of canted front sights for AK-47s. A proper site picture is maintained between the front sight 14 and the rear sight 24. Moreover, a post 16 of the front sight 14 is never shifted to the extreme left or extreme right of the outer peripheral member 18 of the front sight 14. Rather, the post 16 of the front sight 14 is centered within the outer peripheral member 18 since the entire outer peripheral member 18.

Figure 3:
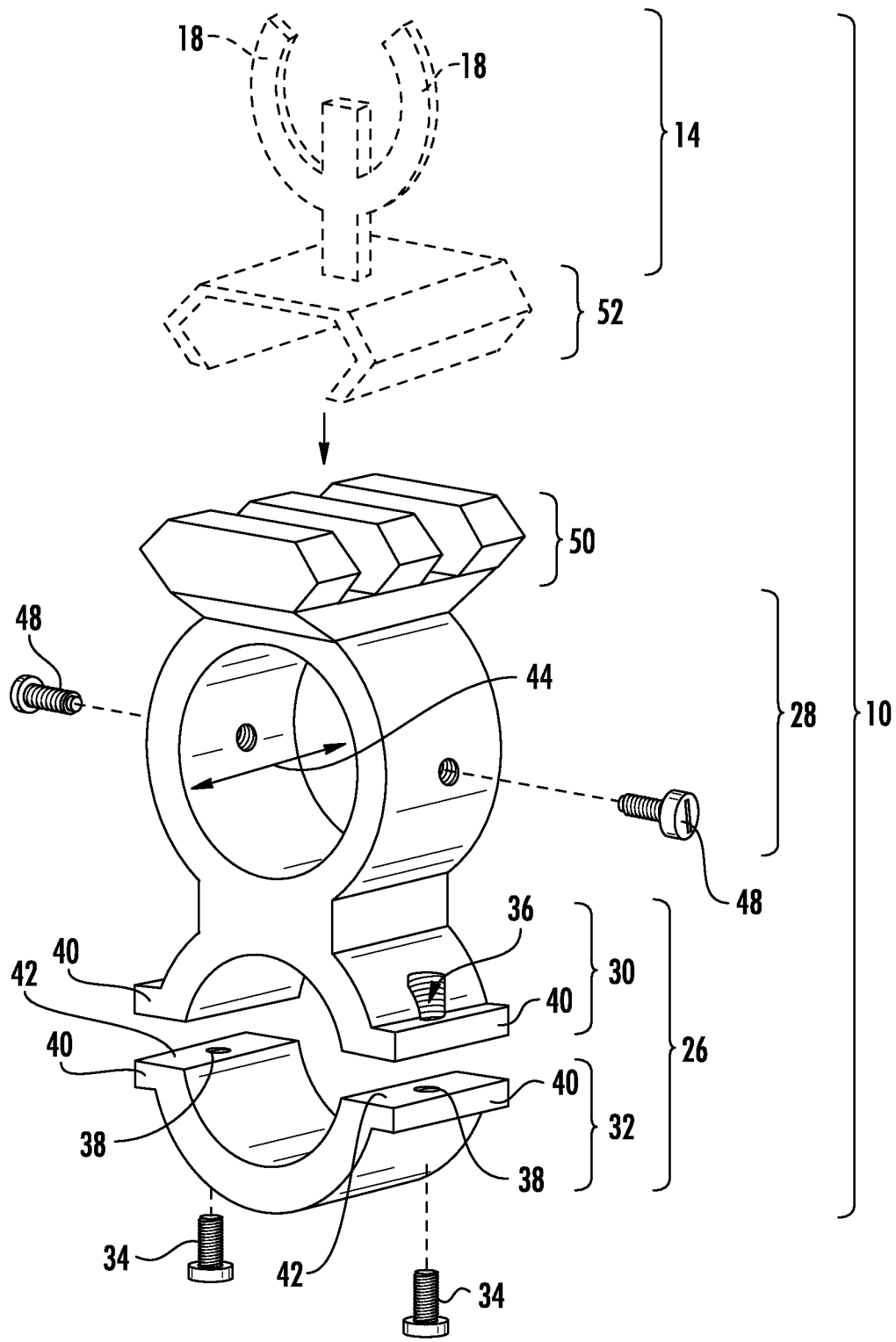
FIG. 3 is a perspective view of a front sight assembly for replacing a stock front sight shown in FIG. 1.
Figure 5:
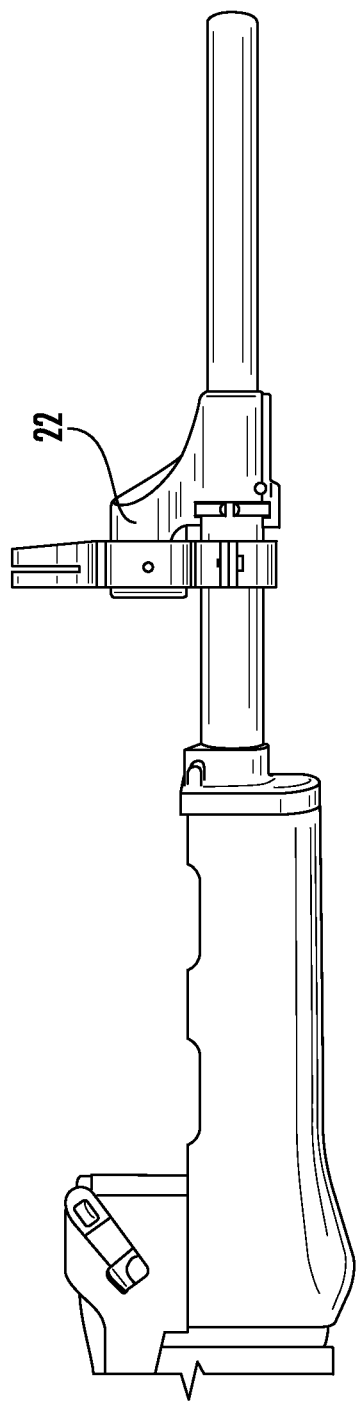
FIG. 5 is a side view of the AK-47 shown in FIG. 4 with a gas tube and a hand guard removed from a gas block and the front sight assembly shown in FIG. 3 installed on the barrel and the gas block.
Figure 7:
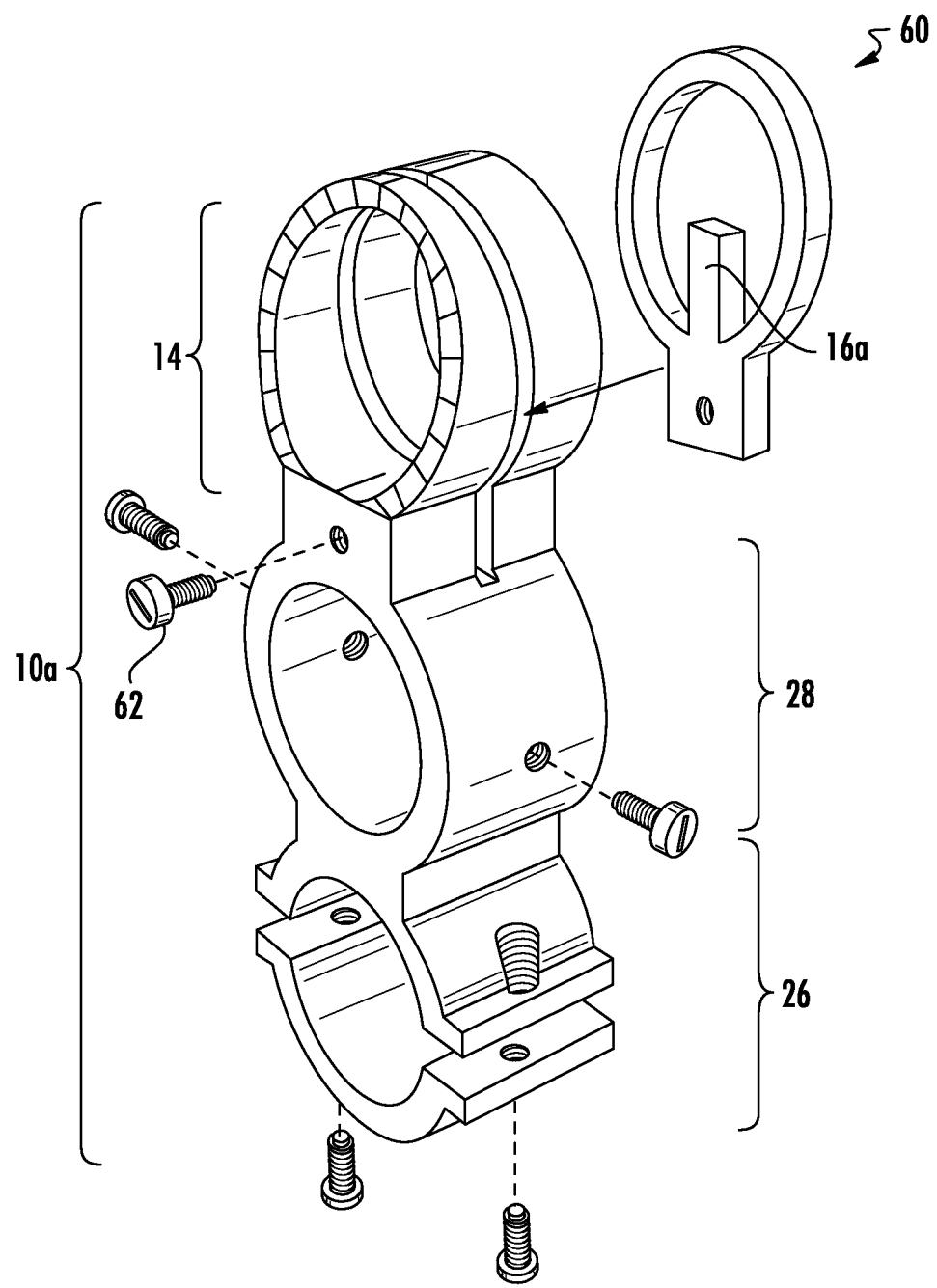
FIG. 7 is a perspective view of a second embodiment of the front sight assembly.
Figure 8:
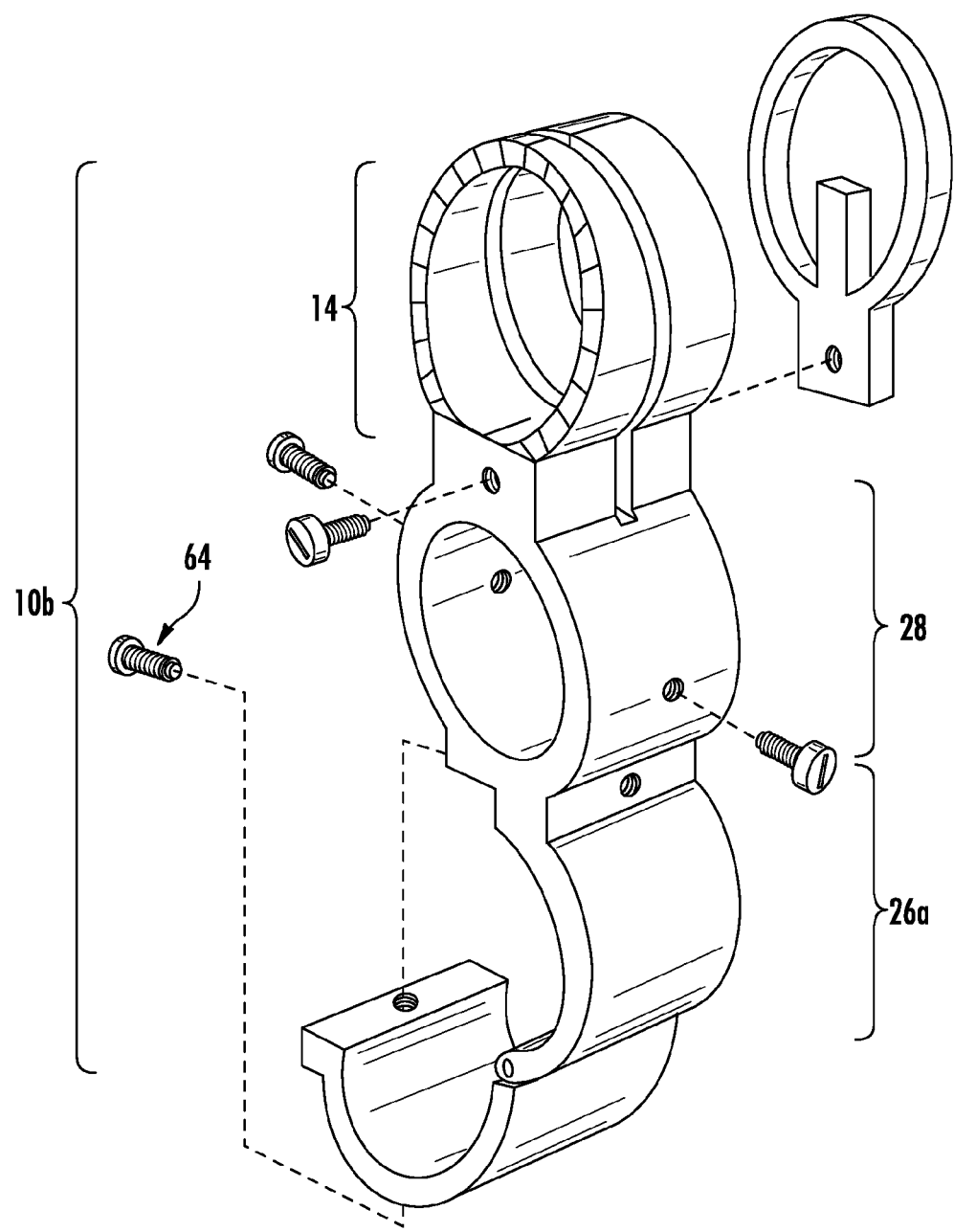
FIG. 8 is a perspective view of a third embodiment of the front sight assembly.

Referring now to FIG. 3, the front sight assembly 10 includes a barrel mount 26, a gas block mount 28 and the front sight 14. The front sight 14 may be removably detachable to the gas block mount 28 as shown in FIG. 3 by way of a picatinny rail or integral therewith as shown in FIGS. 7 and 8. Referring back to FIG. 3, the barrel mount 26 may have a ring configuration. The barrel mount 26 may be traversed between an opened position and a closed position. In the opened position, the barrel mount 26 of the front sight assembly 10 may be disassembled so that the barrel mount 26 may be disposed around the barrel 20 without significant disassembly of the AK-47 12, as shown in FIG. 5. By way of example and not limitation, the barrel mount 26 may have an upper half 30 and a lower half 32. The upper and lower halves (or brackets) 30, 32 may be removably attachable to each other with threaded fasteners 34 which are received into threaded holes 36 formed in the upper half 30 of the barrel mount 26. To mount the barrel mount 26 to the barrel 20, the threaded fasteners 34 are removed from the threaded holes 36 of the upper half 30 of the barrel mount 26. The upper half 30 may have a semicircular inner periphery which corresponds to the circular outer periphery of the barrel 20. The lower half 32 is aligned to the upper half 30. The threaded fasteners 34 are engaged to the threaded holes 36 of the upper half 30 by feeding the threaded fasteners 34 into holes 38 formed in the lower half 32. Moreover, the upper and lower halves 30, 32 may have flanges 40 with interface surfaces 42 that are parallel to each other. The threaded holes 36 of the upper half 30 and the holes 38 of the lower half 32 may be formed in the flanges 40.

The gas block mount 28 may be formed from a unitary material with the upper half 30 of the barrel mount 26. By way of example and not limitation, the gas block mount 28 and the upper half 30 on the barrel mount 26 may be injection molded or machined from a forged or billet material. The gas block mount 28 may also have a ring configuration. The gas block mount 28 may have a circular aperture with an inner diameter 44 greater than an outer diameter 46 of an upper portion of the gas block 22 of the AK-47 12. Preferably, the inner diameter 44 is about 0.1875 inches greater than the outer diameter of the upper portion of the gas block mount 28. The oversized inner diameter 44 of the aperture of the gas block mount 28 permits for lateral adjustments to windage of the front sight 14. When the front sight assembly 10 is mounted to the barrel 20 and gas block 22, the user may utilize left and right set screws 48 in the gas block mount to adjust for windage. The gas block mount 28 may form a continuous circle. To mount the gas block mount 28 over the upper portion of the gas block 22, a hand guard 56 and gas tube 58 are removed from the rear sight block and the gas block 22 of the AK-47. At this time, the upper portion of the gas block 22 is exposed and the gas block mount 28 of the front sight 10 may be disposed over the upper portion of the gas block 22.

The front sight 14 is shown as being removably attachable to the barrel mount 26 with a picatinny rail 50 or a weaver rail. The picatinny rail 50 may be attached to the gas block mount 28. In particular, the picatinny rail 50 may be fabricated from a unitary material with the gas block mount 28 and the upper half 30 of the barrel mount 26. The front sight 14 will have a corresponding mechanism 52 that is removably attachable to the picatinny rail 50.

The picatinny rail 50, gas block mount 20 and the barrel mount 26 may be vertically aligned so that the front sight 14 is vertically positioned above the gas block mount 28 when the front sight assembly 10 is mounted to the AK-47 12. In this regard, minimal windage adjustments are performed when sighting in the front and rear sights 14, 24.

The front sight 14 is shown as being any HK style front sight 14. However, any style of front sight 14 may be incorporated. By way of example and not limitation, the various styles of front sights 14 that may be incorporated are ghost ring, bead, cross hair, post or any of a number of rifle sights.

Figure 4:
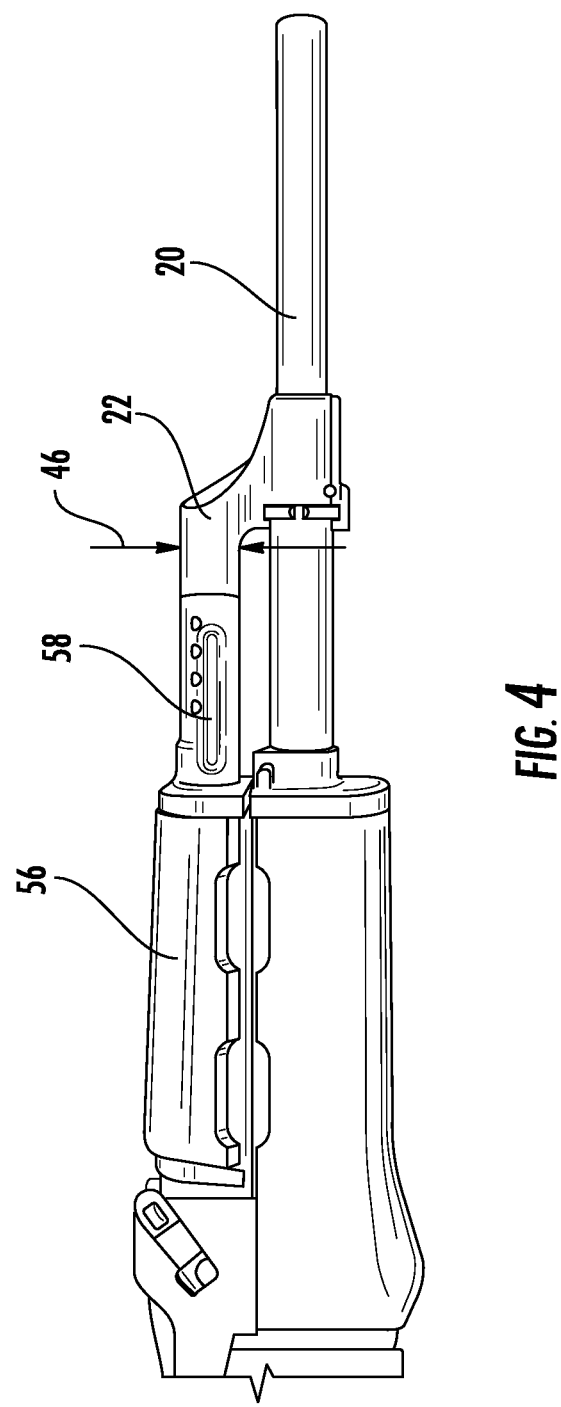
FIG. 4 is a side view of the AK-47 shown in FIG. 1 with the stock front sight removed from a barrel of the AK-47.
Figure 6:
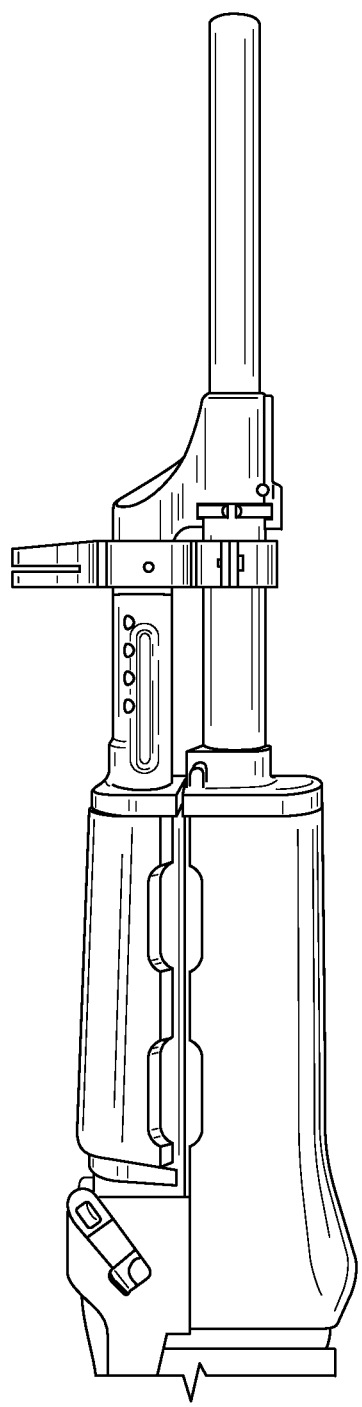
FIG. 6 is a side view of the AK-47 shown in FIG. 5 with the hand guard and gas tube installed on the gas block.

To mount the front sight assembly 10 to the AK-47 12, the stock front sight 54 is removed from the barrel 20 of the AK-47 12 by removing two pins. Referring now to FIG. 4, the stock front sight 54 is removed from the barrel 20. Thereafter, the hand guard 56 and gas tube 58 are removed from the gas block 22, as shown in FIG. 5. At this point, the upper portion of the gas block 22 is exposed so that the gas block mount 28 may be disposed over such upper portion of the gas block 22. To do so, the set screws 48 are loosened so that the set screws 48 do not interfere with the gas block 22. Since the aperture of the gas block mount 28 is oversized, the gas block mount 28 should freely sit around the upper portion of the gas block 22. Additionally, the lower half 32 of the barrel mount 26 is removed from the upper half 30 by way of removing the threaded fasteners 34. In this way, the upper half 30 of the barrel mount 26 and the gas block mount 28 may be positioned on the gas block 22 and the barrel 20. After positioning the gas block mount 28 on the gas block 22 and the upper half 30 of the barrel mount 26 on the barrel 20, the lower half 32 of the barrel 20 is secured to the upper half 30 by inserting the threaded fasteners 34 into the holes 38 of the lower half 32 and engaging the threaded fasteners 34 to the threaded holes 36 of the upper half 30 of the barrel mount 26. The hand guard 56 and the gas tube 58 are assembled back onto the AK-47 12 as shown in FIG. 6. The threaded fasteners 34 are tightened so that the barrel mount 26 does not wiggle about the barrel 20. Rather, the barrel mount 26 is snug on the barrel 20 and can pivot about the barrel 20.

To sight in the front sight 14 of the front sight assembly 10, the threaded fasteners 34 are tightened snugly to prevent the front sight assembly 10 from sliding left to right or up and down. However, the threaded fasteners 34 should not be over tightened to prevent rotation of the front sight assembly 10 about the barrel 20. In other words, the barrel mount 26 should rotate around the barrel 20 to allow the set screws 48 of the gas block mount 28 to adjust for windage.

Provided that the shooter is achieving a sufficiently tight shot group of three or more shots, the set screws 48 may be used to adjust for windage. In particular, if the shot group (i.e., point of impact) is to the right of the point of aim, then the right set screw 48 may be loosened and the left set screw 48 may be tightened. Conversely, if the shot group (i.e., point of impact) is to the left of the point of aim, then the left set screw 48 may be loosened and the right set screw 48 may be tightened. This process may be repeated until the point of impact is aligned to the point of aim.

Referring now to FIG. 7, a second embodiment of the front sight assembly 10a is shown. The front sight assembly 10a has a barrel mount 26 and a gas block mount 28. The front sight 14 is made integral with the gas block mount 28 in that the front sight 14 is permanently attached to the gas block mount 28. The post 16a of the front sight 14 may be changed out as desired by the user. In FIG. 7, the post 16a is a straight post. However, other types of front sight designs are also contemplated and may be changed out. In particular, the post 16a is incorporated into a blade 60. The blade 60 is securable to the front sight 14 by way of set screw 62 and may be changed out as desired.

Referring now to FIG. 8, a third embodiment of the front sight assembly 10b is shown. The front sight assembly 10b has the gas block mount 28 and the front sight 14 made integral with the gas block mount 28. The barrel mount 26a has a clamshell configuration that can be traversed between an opened and closed position for mounting to the barrel 20. The clamshell design of the barrel mount 26a may be tightened by way of set screw 64.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A replacement front sight for an AK-47, the replacement from sight comprising:

a gas block mount having an upper aperture for receiving a gas block of the AK-47, the gas block mount having left and right lateral adjusters;

a barrel mount attached to a bottom side of the gas block mount, the barrel mount having a lower aperture for receiving a barrel of the AK-47;

a front alignment member attached to an upper side of the gas block mount for alignment with a rear alignment member of a rear sight of the AK-47;

wherein left and right adjusters are adjusted to sight in the front alignment member and the rear alignment member so that the point of impact coincides with the point of aim of the AK-47.

2. The replacement front sight of claim 1 wherein the gas block mount and the barrel mount are fabricated from metal.

3. The replacement front sight of claim 1 wherein the aperture sole gas block mount has a continuous circular inner periphery.

4. The replacement front sight of claim 1 wherein the barrel mount comprises an upper bracket and a lower bracket, the lower bracket being removable from the upper bracket for mounting the barrel mount to the barrel of the AK-47 without disassembly of the barrel of the AK-47.

5. The replacement front sight of claim 1 wherein the left and right adjusters are disposed about a vertical midpoint of the gas block mount on opposed sides of the as block mount.

6. The replacement front sight of claim 1 wherein the left adjuster is a set screw threadably engaged to a left threaded hole in a left side of the gas block mount, and the right adjuster is a set screw threadably engaged to a right threaded hole in a right side of the gas block mount.

7. The replacement front sight of claim 1 wherein the aperture of the gas block mount has a circular inner periphery and an inner diameter of the inner periphery is about 0.1875 inches greater than an outer diameter of an upper portion of the gas block.

8. A replacement front sight for straightening a canted original front sight of an AK-47, the replacement front sight comprising:

a gas block mount having an upper aperture for receiving a gas block of the AK-47, the gas block mount having left and right lateral adjusters;

a barrel mount attached to a bottom side of the gas block mount, the barrel mount having a lower aperture for receiving a barrel of the AK-47;

a mount for a front alignment member, the mount attached to an upper side of the gas block mount;

wherein left and right adjusters are adjusted to sight in the front alignment member and a rear alignment member of a rear sight of the AK-47.

* * * * *